United States Patent
Forkey et al.

(10) Patent No.: US 7,116,486 B2
(45) Date of Patent: Oct. 3, 2006

(54) CYLINDRICAL OPTICAL DEVICES AND METHOD OF MANUFACTURE

(75) Inventors: Richard E. Forkey, Westminster, MA (US); Richard G. Cyr, New Ipswich, NH (US); Robert N. Ross, Gardner, MA (US)

(73) Assignee: Precision Optics Corporation, Inc., Gardner, MA (US)

( * ) Notice: Subject to any disclaimer, the term of this patent is extended or adjusted under 35 U.S.C. 154(b) by 0 days.

(21) Appl. No.: 10/659,727

(22) Filed: Sep. 10, 2003

(65) Prior Publication Data

US 2005/0083581 A1    Apr. 21, 2005

(51) Int. Cl.
*G02B 11/00* (2006.01)
*G02B 13/00* (2006.01)
*G02B 15/00* (2006.01)
*G02B 17/00* (2006.01)
*G02B 25/00* (2006.01)

(52) U.S. Cl. ............... 359/642; 385/34; 385/84; 385/92; 385/93

(58) Field of Classification Search .......... 359/642; 385/34, 66–68, 84, 92–94, 117; 600/101, 600/128, 920
See application file for complete search history.

(56) References Cited

U.S. PATENT DOCUMENTS

| | | | |
|---|---|---|---|
| 3,204,326 A * | 9/1965 | Granitsas | 29/872 |
| 3,329,074 A | 7/1967 | Gosselin | |
| 4,382,803 A | 5/1983 | Allard | 51/298 |
| 5,122,650 A | 6/1992 | McKinley | 250/208 |
| 5,157,553 A | 10/1992 | Phillips et al. | 359/744 |
| 5,223,974 A | 6/1993 | Phillips et al. | 359/641 |
| 5,439,578 A * | 8/1995 | Dovichi et al. | 204/603 |
| 5,461,444 A | 10/1995 | Okura et al. | |
| 5,530,940 A * | 6/1996 | Ludwig et al. | 385/31 |
| 5,584,982 A * | 12/1996 | Dovichi et al. | 204/603 |
| 5,603,687 A | 2/1997 | Hori et al. | 600/166 |
| 5,613,769 A | 3/1997 | Parkyn, Jr. et al. | 362/338 |
| 5,673,147 A | 9/1997 | McKinley | 359/462 |
| 5,680,260 A | 10/1997 | Farcella et al. | |
| 5,741,412 A * | 4/1998 | Dovichi et al. | 204/602 |
| 5,751,341 A | 5/1998 | Chaleki et al. | 348/65 |
| 5,760,976 A | 6/1998 | DeLaMatyr et al. | |
| 5,993,294 A | 11/1999 | Gottschald | 451/43 |
| 6,088,157 A * | 7/2000 | Mazurkewitz | 359/434 |
| 6,219,182 B1 | 4/2001 | McKinley | 359/407 |
| 6,822,803 B1 * | 11/2004 | Muto et al. | 359/642 |
| 2002/0013532 A1 | 1/2002 | Czubko et al. | 600/478 |
| 2002/0086613 A1 | 7/2002 | Hatano | 451/5 |
| 2002/0087047 A1 | 7/2002 | Remijan et al. | 600/109 |

FOREIGN PATENT DOCUMENTS

DE    9200876 U    4/1993
DE    4438511 A    9/1995

(Continued)

*Primary Examiner*—Ricky L. Mack
*Assistant Examiner*—Brandi Thomas
(74) *Attorney, Agent, or Firm*—George A. Herbster

(57) ABSTRACT

A lens assembly and method for manufacture. The lens assembly includes at least one lens element, with multiple sawn planar faces formed parallel to an optical axis and spaced equidistantly from the optical axis so the lens element has a polygonal cross section. Each lens element has a centered, rotationally symmetric characteristic so the overall assembly has a corresponding characteristic. The manufacture includes the step of utilizing oversized conventional cylindrical lens elements and other optical elements formed into lens systems. The faces are sawn to reduce the overall size. A circumscribing sheath provides a segmental lumen along each face.

25 Claims, 6 Drawing Sheets

FOREIGN PATENT DOCUMENTS

| | | |
|---|---|---|
| EP | 0105706 A | 4/1984 |
| EP | 1211525 A | 6/2002 |
| JP | 04183477 A * | 6/1992 |
| WO | WO 91/15793 | 10/1991 |
| WO | WO 02/37160 A | 5/2002 |
| WO | WO 2005026813 A1 * | 3/2005 |

* cited by examiner

CYLINDRICAL OPTICAL DEVICES AND METHOD OF MANUFACTURE

BACKGROUND OF THE INVENTION

1. Field of the Invention

This invention generally relates to optical devices and methods for the manufacture of such optical devices and more particularly to optical devices with lens systems of a small diameter.

2. Description of Related Art

Endoscopes are examples of optical devices that utilize optical systems characterized by an assembly of a plurality of optical elements, such as lenses, that are serially disposed along an optical axis. In an endoscope, for example, a lens system comprising multiple lens elements at a distal end constitutes an objective; a lens system at the proximal end constitutes an eyepiece; and one or more groups of intermediate lens elements define one or more relay lens systems.

Endoscopes utilizing such systems generally have working channels and lumens. Some working channels are filled with fiber to enable an external light source to illuminate a field of view. Others allow a surgeon to move instruments along the length of the endoscope to perform some function at the distal end while simultaneously viewing the area being treated. Still other working channels allow a surgeon to dispense a therapeutic, diagnostic or other material at the distal end of the endoscope, again while simultaneously viewing the area being treated.

Endoscopes and other optical devices of this nature generally are formed with cylindrical lens elements extending along a centered optical axis. The lens elements generally have concave, planar or convex end, image forming surfaces that are transverse to the optical axis. Multiple lens elements may be adjoined in lens systems in order to achieve particular optical characteristics, all as known in the prior art. Such lens elements and lens systems are called centered, rotationally symmetrical lens elements and systems, respectively.

Medical personnel who use these optical devices now indicate a preference for optical devices that have smaller and smaller diameters. In fact some optical devices are now produced with an outer diameter of 1 to 2 mm using traditional lens making methods. However products that achieve these goals are difficult to manufacture with traditional lens making methods.

Traditional lens making methods include grinding and polishing operations to produce approximately spherical or other shaped image forming surfaces at the entrance and exit faces that define the optical characteristics of that lens element. Then the lens element is rotated about its geometric axis that will generally lie on the optical axis. A geometric axis is defined as a straight line locus of the centers of curvature of the refracting surfaces. The outer lens boundary then can be made essentially circular, as by abrasive grinding, such that the result is essentially a right circular cylinder with or imaging forming spherical end surfaces and a cylindrically centered axis, i.e., a centered, rotationally symmetrical lens element. Individual lens elements can then be adjoined along the optical or geometric axis to form a lens system.

The ability to make smaller optical devices including those with lens systems that continue to exhibit centered rotationally symmetrical characteristics, becomes more difficult as the lens diameter reduces. First, the final diameter of the lens is controlled by the location of the grinding or edging tool with respect to the optical axis including any positional variation due to tolerances in the manufacturing equipment. In conventional lenses these tolerances do not constitute a significant portion of the overall lens diameter. However, to achieve an absolute tolerance as a constant percentage of very small diameters requires extreme accuracy and tools that operate with extremely close tolerances. Machines for providing such accuracies become increasingly expensive as tolerance requirements become more stringent.

Second, in these optical devices, a lens element generally has an axial length that is several times the diameter. At small diameters it becomes difficult to support the lens element so that its optical axis remains in a single position relative to a tool reference. Moreover, As the diameter decreases the lens element becomes, in effect, more brittle and thus extremely fragile. These factors lead to an increased potential for breakage during manufacture.

Thus about 1–2 mm tends to be a practical minimum diameter for any lens element manufactured by traditional lens manufacturing methods. Lens systems in most currently commercially available endoscopes have an outer diameter of approximately 1.7 mm or greater. Endoscopes with such readily available lens elements are too big to be used in many applications including medical applications such as viewing fine vascular structure, minimally invasive endoscopy such as neurological and neurosurgical applications and arthoscopy, ear, nose and throat (ENT) applications, cardiac surgical applications, and many endoscope applications that can benefit from the use of stereoscopic endoscopes.

What is needed is a method for enabling the manufacture of lens elements and lens systems having maximum cross sectional dimensions that can be as little as 1 mm or less.

SUMMARY

Therefore it is an object of this invention to provide a method of manufacturing lens systems that are less than 1 or 2 mm in diameter.

Another object of this invention is to provide a lens element with high centering accuracy that is capable of being made with a diameter of less than approximately 1 mm.

Still another object of this invention is to provide a method of manufacturing lens systems from a conventional centered, rotationally symmetrical lens system useful in optical devices with a reduced outer diameter to less than 1 mm wherein the final lens system exhibits point symmetry.

In accordance with one aspect of this invention, an optical device that extends along a geometric axis includes a final lens element and a surrounding sheath. The final lens element is formed from an initial lens element characterized by centered, rotational symmetry about an optical axis and has at least one sawn planar face parallel to and spaced from the geometric axis extending between image forming surfaces transverse to said geometric axis at each end of said final lens element.

In accordance with another aspect of this invention, an optical device extending along a geometric axis includes a final lens system and a surrounding sheath to support the lens system along the geometric axis. The final lens system is formed from a plurality of adjoined initial lens elements having centered, rotational symmetry about an optical axis, each of said initial lens elements having a pair of spaced image forming surfaces transverse to the optical and geometric axes. The final lens assembly has at least one sawn planar face extending along the length thereof parallel to and spaced from the geometric axis.

In accordance with still another aspect of this invention, a lens system is manufactured by constructing an initial lens system and then removing portions of the lens elements in that lens system. The initial lens system is constructed with at least one lens element. Each lens element has an optical axis and is characterized by a centered rotational symmetry about the optical axis and by image forming surfaces transverse to the optical axis. The removal of portions of the lens elements in the lens system by sawing forms planar faces on the lens system parallel to the geometric axis whereby said lens system has a polygonal cross section.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
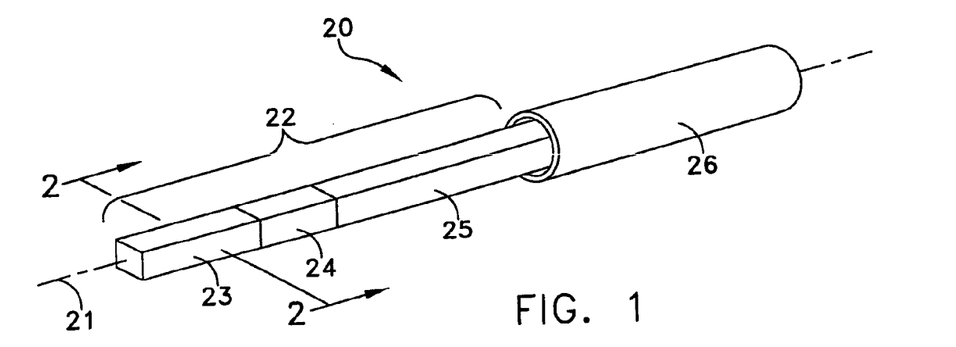
FIG. 1 is a perspective view of an optical device constructed in accordance with this invention.
Figure 2:
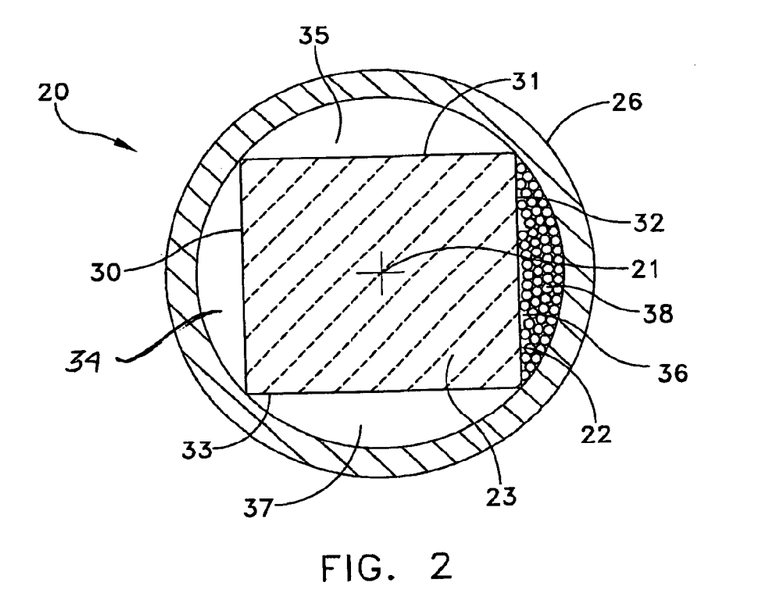
FIG. 2 is a cross-section of the optical device taken along lines 2—2 in FIG. 1.
Figure 3:
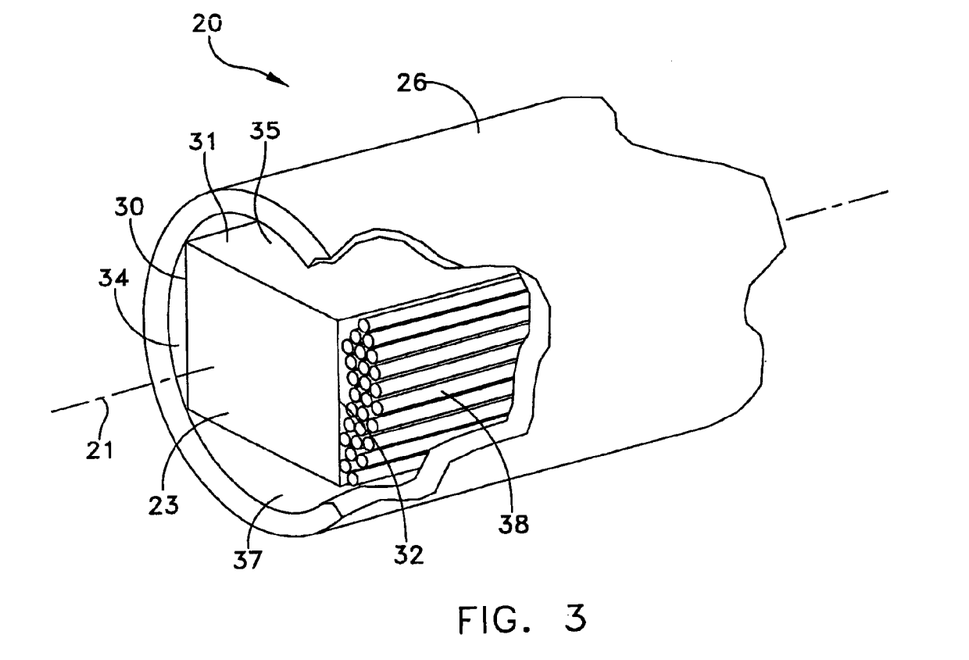
FIG. 3 is another perspective view to illustrate the construction of the optical device in FIGS. 1 and 2.

FIGS. 1 through 3 depict a portion of an optical device 20, such as an endoscope, constructed in accordance with this invention that lies along an axis 21. In this embodiment, the optical device 20 includes a lens system 22 with adjoined lens elements 23, 24 and 25. Each of the lens elements 23, 24 and 25 and the lens system 22 have centered rotational symmetry with respect to the axis 21. In this particular embodiment, the axis 21 is coincident with the optical and geometric axes of the optical device. Although not shown, but as will be known to persons of ordinary skill in the art, the end surfaces of each lens element constitute image forming surfaces that are polished, generally spherical surfaces that produce an image of any object proximate the axis 21. As manufacture and use of lens elements with such surfaces are known, FIGS. 1 through 3 do not depict a specific spherical surface. A flat transverse surface is shown as a representation of an entire class of image forming surfaces.

A sheath 26 circumscribes the lens system 22 and defines an outer diameter $d_o$. Referring specifically to FIG. 2 and in accordance with this invention, the lens element 23, like the lens elements 24 and 25, has a polygonal shape in cross-section, in this particular embodiment a regular polygon cross-section and specifically a square cross-section. That is, in cross section the lens element 23, and all the other lens elements in the lens system 22, form a square bounded by four flat surfaces 30, 31, 32 and 33 that intersect at right angles and are equidistant from the axis 21. Moreover, in FIGS. 1 through 3 the axis 21 is representative of the optical axis and the geometric axis because these axes are coincident.

As the sheath 26 is circular and circumscribes the square lens element 23, each face forms a chord that, with the sheath 26 defines an axially extending working channel with a cross section in the form of a segment. Such working channels are called "segmental working channels" in the following description. In FIGS. 1 through 3 segmental working channel faces 30 through 33 define one boundary of each of segmental working channels 34, 35, 36 and 37, respectively. At least one of these segmental working channels, such as the segmental working channel 36, could be used to contain optical fibers 38 for transferring light from the proximal end of the optical device beyond the distal end to illuminate a field of view. The other segmental working channels could accommodate instruments or therapeutic or diagnostic material or both or other agents such as water and saline solution.

As will be apparent, one characteristic of this invention is that placing a lens system with a polygonal cross section in a circumscribing cylindrical sheath automatically produces the segmental working channels. It will also be apparent that the transverse cross sectional area of a segmental working channel increases as the number of faces decreases.

Optical devices such as shown in FIGS. 1 through 3 can have a wide range of diameters. Lens assemblies in accordance with this invention have been constructed with outer sheath diameters, $d_o$, of 1.2 mm. Optical devices with even smaller diameters are anticipated.

Figure 4:
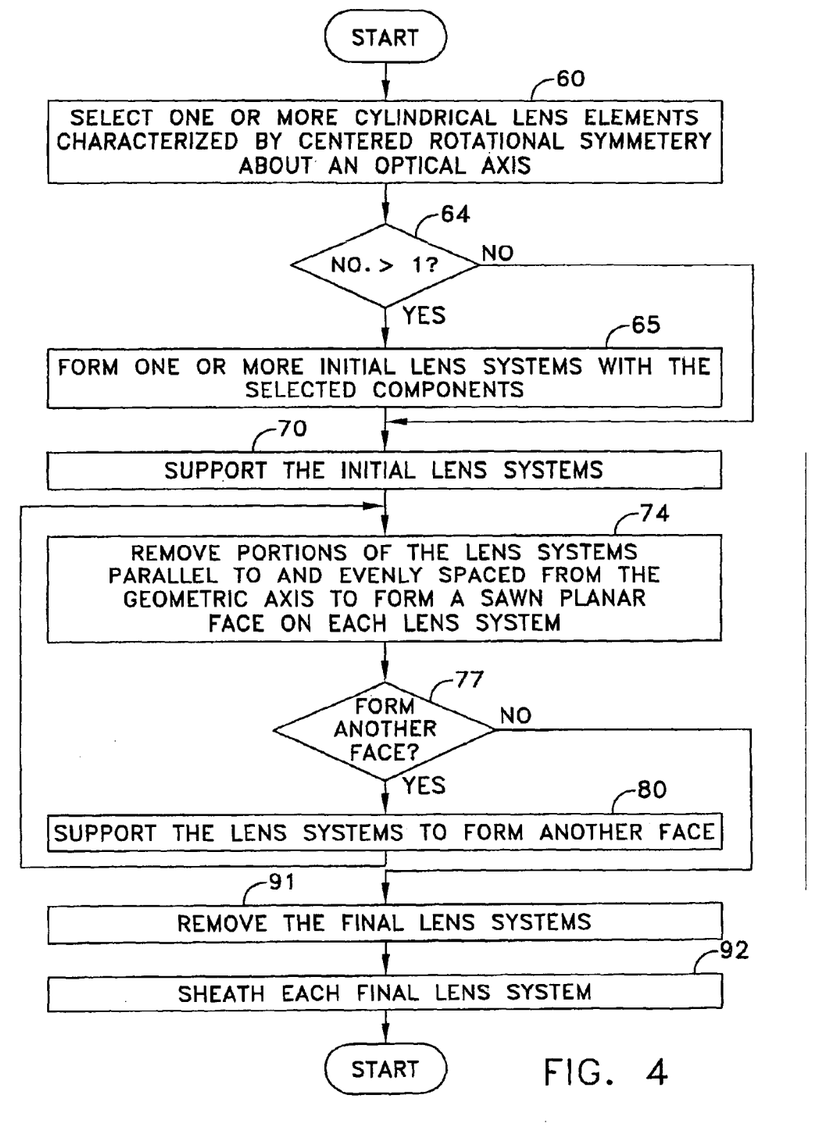
FIG. 4 is a chart that depicts major steps in the manufacturing process for obtaining the optical device shown in FIG. 1.
Figure 5A:
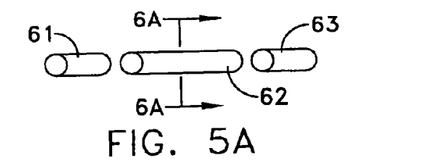
FIGS. 5A through 5I are illustrative of certain steps in the manufacturing process shown in FIG. 4.
Figure 6A:
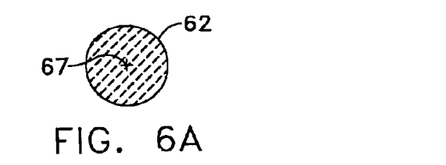
FIGS. 6A through 6I are illustrative of the appearance of an optical device at various stages during the manufacturing process of FIG. 4.

The method for making these lenses is described in FIGS. 4, 5A through 5I and 6A through 6I. This particular method is described with respect to manufacturing a final lens system or systems in which the geometric and optical axes are coincident and in which a cross section normal to the axes is a square. Step 60 in FIG. 4 represents the selection of one or more initial cylindrical lens elements characterized by having a centered rotational symmetry with coincident optical and geometric axes. If it is an objective to produce a three-piece initial lens assembly, process 60 represents the selection of optical elements 61, 62 and 63 as shown in FIG. 5A with the cross section shown in FIG. 6A. The diameter should be at least as large as the diameter of a circle that will circumscribe the final lens system. These lens elements will have different end faces forming convex, concave, planar or other image forming surfaces in order to achieve the desired optical characteristics as previously described.

Figure 5B:
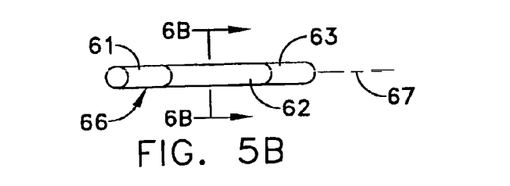
Figure 6B:
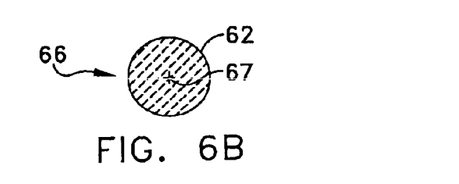

Referring to FIG. 4, if, as in this example, a decision is made at step 64 of FIG. 4 as to whether a final lens system will contain multiple lens elements like the lens system shown in FIG. 5B with the geometric axis of the final lens system (hereinafter the "final geometric axis") coincident with the optical axis 67. Step 65 in FIG. 4 sets up the formation of one or more initial lens assemblies. FIG. 5B shows a single initial lens assembly 66 formed by joining, typically by cementing, the initial lens elements 61 through 63 along an optical axis 67. A cross-section FIG. 6B depicts the initial lens system 66 with its circular cross section and one initial lens element 62 that is centered on the optical axis 67. As previously indicated, the lens elements 61 through 63 and the lens assembly 66 are characterized by a centered rotational symmetry about the optical axis 67. Moreover, the optical axis 67 is coincident with the geometrical axes through the initial lens assembly 66 and each of the initial lens elements 61 through 63.

Figure 5C:
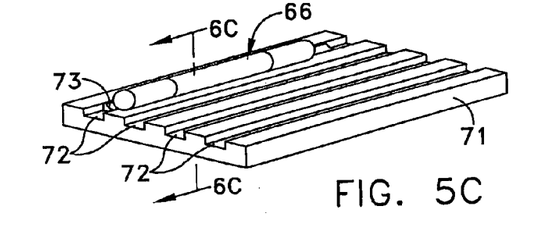

Once the initial lens assembly is formed, step 70 of FIG. 4 represents the procedure of providing a support for each initial lens assembly, such as the initial lens assembly 66. In accordance with one aspect of this invention, a tool 71 in FIG. 5C is formed with a plurality of parallel support slots 72. The slot width is selected to provide a stable support for an initial lens system. FIG. 5C shows the single initial lens system 66 for clarity. It also will become apparent that multiple initial lens systems may be positioned in each support slot. It will be apparent that these multiple initial lens systems can be spaced along a single slot and have different initial lens elements. Generally it is merely necessary to assure that all the lens systems in a single support slot should be selected so they will have the same finished cross section.

In one particular embodiment, the tool 71 is formed of a float glass plate and the support slots 72 are formed by a dicing saw. Dicing saws are regularly used in the semiconductor industry and are constructed to have cutting tolerances consistent with an indexing accuracy cumulative error of 0.001 mm per 160 mm traversal or less.

Figure 6C:
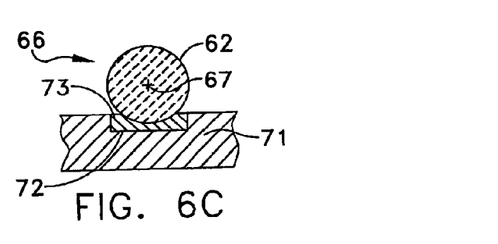

As shown in FIGS. 5C and 6C, a thermoplastic cement 73 fills the support slots, like the support slot 72 to capture each initial lens assembly, such as the initial lens system 66, in the tool 71. The initial lens system 66, particularly the initial lens element 62, now lies in the support slot 72 filled with the thermoplastic cement 73 and is rigidly fixed. This process positions the initial lens systems accurately for subsequent processing.

Figure 6D:
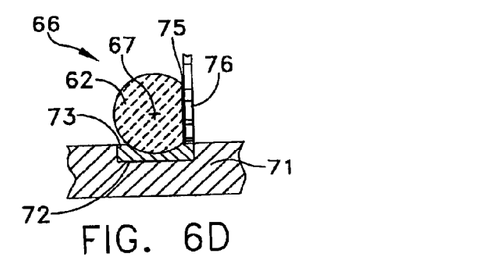

Step 74 in FIG. 4 represents a process by which a portion of the initial lens system 66 is removed to form a sawn planar face 75 of FIG. 6D that is equally spaced from the desired final geometric axis that in this specific example is coincident with the optical axis 67. In accordance with one aspect of this invention, the distance to the final geometric axis measured perpendicular to a face, such as the sawn face 75 of FIG. 6D is $(d_f/2)\sin 45°$ where $d_f$ represents the desired finished size of the lens system measured diagonally between opposite corners. As will be apparent, this distance is one-half of the width of a face.

Figure 5D:
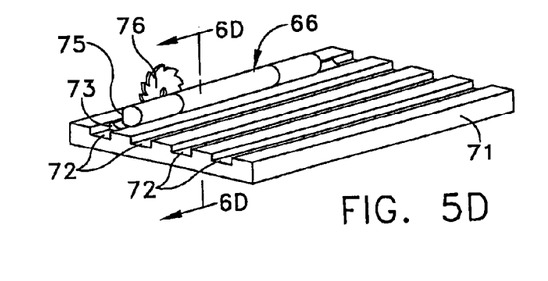

As shown in FIGS. 5D and 6D, a dicing saw 76, positioned to form a vertical cut relative to the tool 71, removes material from the lens assembly to define the sawn face 75 at some predetermined distance from the axis 67. Commercially available dicing saws make such a cut so that the face 75 is at a fixed distance from the optical axis 67 with an accuracy of 0.001 mm per 160 mm of traversal or less.

If a decision were made to produce a lens with a single sawn face, step 77 would terminate further processing steps. Consequently the final lens system would have a single sawn surface as shown in FIG. 6D.

Figure 5E:
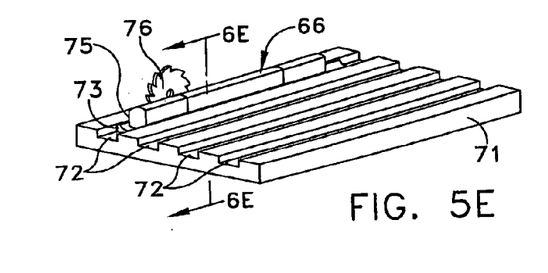
Figure 6E:
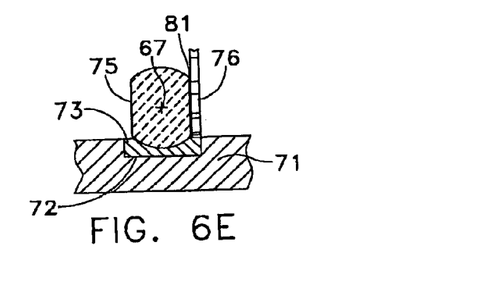

However, in most applications of this invention it is desired to have a final lens system with multiple sawn surfaces so assuming a decision has been made to form such additional faces, step 77 of FIG. 4 transfers control to step 80 that represents a procedure for properly supporting the lens systems for forming another sawn face. To produce a final lens system with a square cross section in a plane normal to the final geometric axis 67, step 80 requires that the tool 71 be rotated 180° and realigned. As shown in FIGS. 5E and 6E the dicing saw 76 is positioned. It saws a face 81 that is parallel to the face 75 and is equidistant from the geometric axis.

Figure 5F:
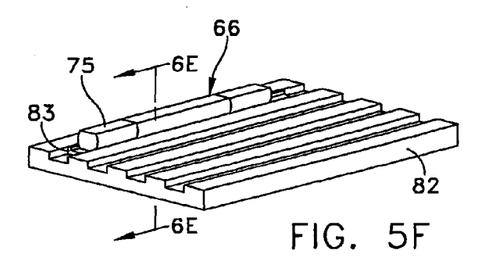
Figure 6F:
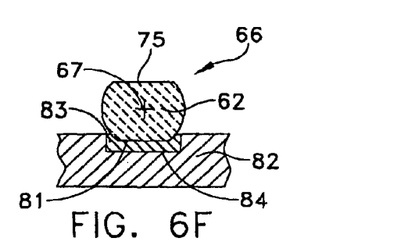

If additional surfaces are to be formed, step 80 in FIG. 4 needs to rotate the lens systems by 90°, such as by removing them from the tool 71 and placing them in another tool 82 having wider support slots 83 as shown in FIGS. 5F and 6F. A thermosetting material 84 then fills the support slots 83 to capture the lens system 66. Now the faces 75 and 81 are horizontal and in FIGS. 5F and 6F the face 75 is above the face 81. The lens system 66 obviously could be reversed such that the face 75 was in contact with the tool 82.

Figure 5G:
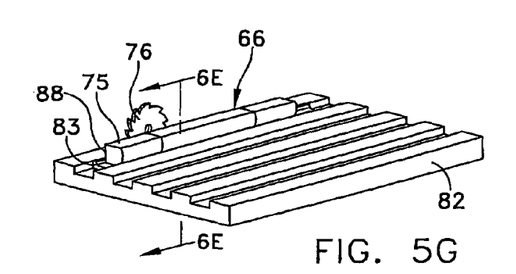
Figure 5H:
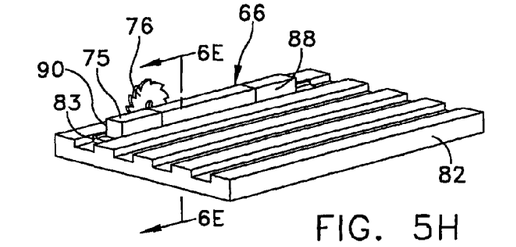
Figure 6G:
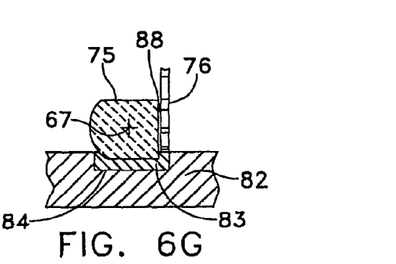
Figure 6H:
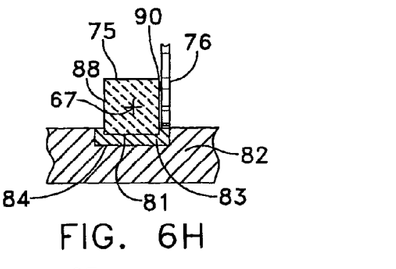

Steps 77 and 80 in FIG. 4 represent the procedures by which the lens systems are sawn in succession. In a cut as shown in FIGS. 5G and 6G, the dicing saw produces a third sawn face 88 that is perpendicular to the sawn faces 75 and 81 and that is equidistant from the geometric axis 67. Then the tool 82 can be rotated 180° and aligned as shown in FIGS. 5H and 6H, so the dicing saw produces a fourth sawn face 90 parallel to the third sawn face 88, perpendicular to the sawn faces 75 and 81 and equidistant from the geometric axis 67.

Figure 5I:
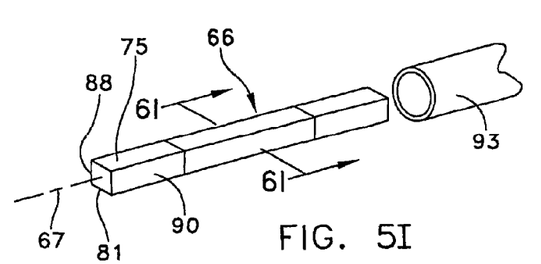
Figure 6I:
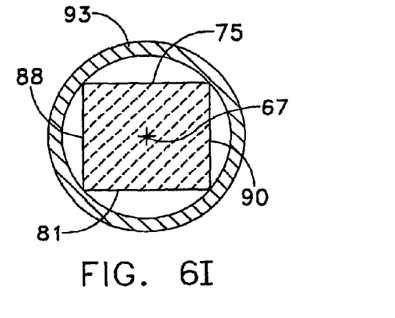

When this processing has been completed, step 91 in FIG. 4 represents the step of removing each final lens system from the tool 82. Step 92 represents the procedure of supporting the final lens systems in a sheath 93 as shown in FIGS. 5I and 6I to complete the optical device.

As will now be apparent, the procedures and controls of FIG. 4 merely provide a work path organization to depict the various major processes to produce lens elements and systems in accordance with this invention. It will also be apparent that this method of manufacture by successive sawing of an initial lens system produces a final lens system that has a very small diameter without the need for expensive grinding or other operations. This procedure allows a manufacturer to use large conventional, economical lens elements as a foundation for the very small lens assembles. With each sawing operation the lens assembly becomes smaller. However, sawing allows the lens assembly to be fully supported during all the operations. This compensates for any breakage due to an increasing brittle nature of the lens assembly as manufacture proceeds. Generally the controls of steps 60, 65, 70, 74, 80, 91 and 92 and decisions 64 and 77 all operate to produce a lens system having a plurality of axially extending flat sawn faces that lie in intersecting planes. This process has been used successfully to manufacture centered, point symmetric lenses circumscribed by a sheath having an inner diameter of 0.6 mm and an outer diameter of 0.85 mm. Optical devices with such reduced diameter or even smaller diameters will be useful in a large number of applications heretofore unavailable for endoscopic diagnosis and therapy.

Figure 7A:
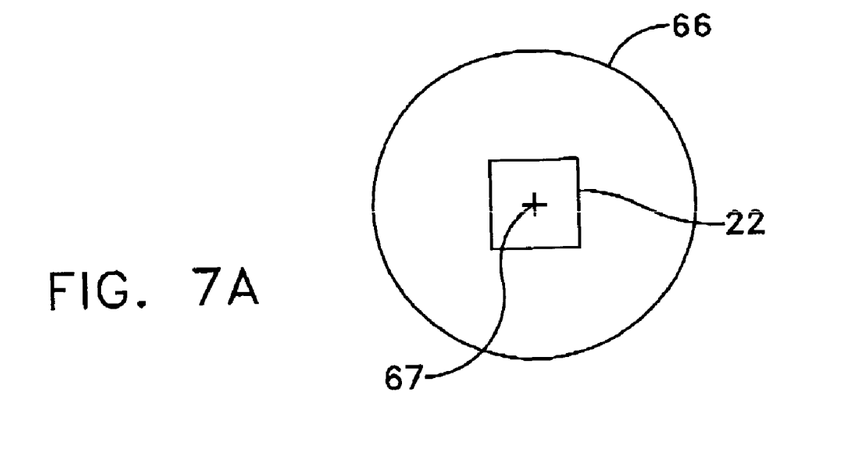
FIGS. 7A through 7C are useful in understanding variations of the method and construction depicted in FIGS. 1 through 6I.
Figure 7B:
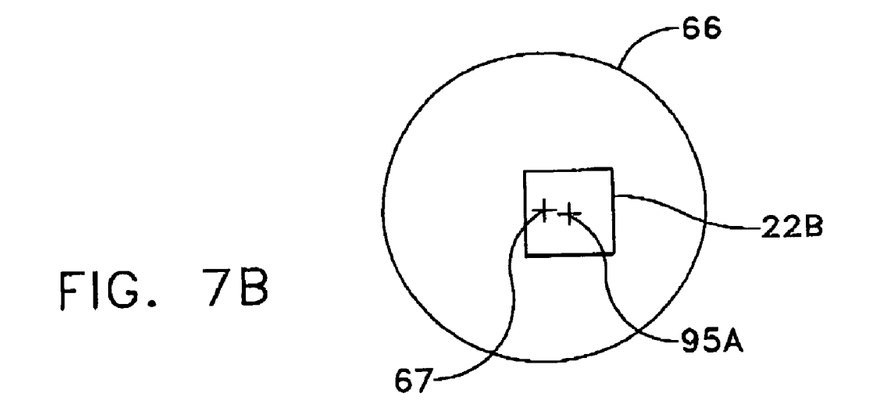

This invention has been described in terms of one specific embodiment in which each of the lens elements selected for the lens assemblies are characterized by centered, rotational symmetry about coincident optical and geometric axes and in which the final lens system exhibits point symmetry about coincident geometric and optical axes. FIG. 7A schematically depicts such a configuration in which optical axis 67 is coincident with the geometric axis of the initial lens assembly 66 and the final lens assembly 22. FIG. 7B depicts a variation in which the optical and geometric axis 67 of the lens assembly 66 are parallel but spaced. Processing according to FIG. 4 is modified so that the support of the lens systems positions them to produce sawn planar faces at predetermined positions from a geometric axis 95A that is offset from the optical axis 67. In this specific embodiment, the boundary of the resulting final lens system 22B includes the optical axis 67. Such an approach would be useful for producing lens systems characterized by having an eccentric pupil.

Figure 7C:
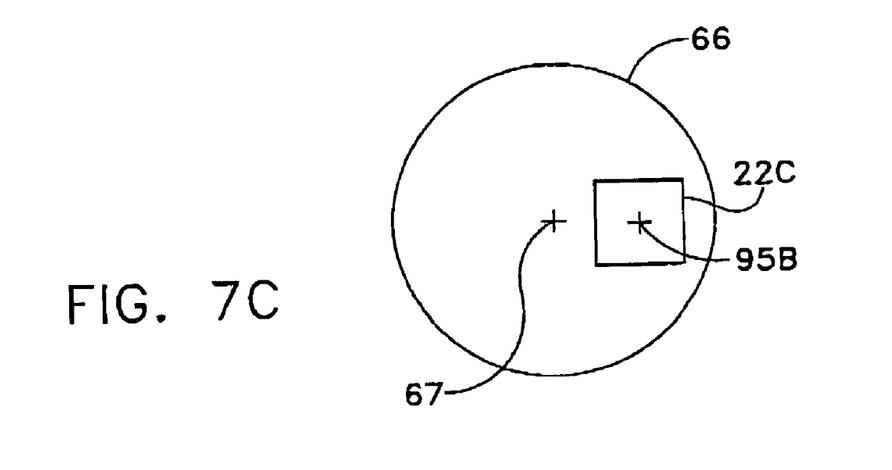

Similarly FIG. 7C depicts a final lens system 22C with a geometric axis 95B offset from the optical axis 67. In this embodiment the optical axis 67 lies outside the boundaries of the final lens system 22C. Such an approach would be useful for producing lens systems with unobstructive apertures "eccentric pupil" systems) such as a confocal reflective microscope or a Schwarzchild arrangement microscopic or telescopic system.

Similarly FIG. 7C depicts a final lens system 22C with a geometric axis 95C offset from the optical axis 67. In this embodiment the optical axis 67 lies outside the boundaries of the final lens system 22C. Such an approach would be useful for producing lens systems with unobstructive apertures "eccentric pupil" systems) such as a confocal reflective microscope or a Schwarzchild arrangement microscopic or telescopic system.

Each of the foregoing embodiments is characterized by a geometric axis that is coincident with or parallel to the optical axis of an initial lens assembly. To achieve still other optical properties, the sawing operation might also be controlled to produce sawn faces parallel to a geometric axis that is oblique to the optical axis.

This invention has been described in terms initial and final lens assemblies. Multiple lens assemblies can also be produced each having different structures. Those different lens assemblies could form lens subassemblies such as objectives, eyepieces and relay lens assemblies for use in endoscopes with each optical device being held in a single sheath or individual sheath assemblies being positioned in an outer sheath. It will also become apparent that other sawing or equivalent techniques may be used or may come into existence that will provide even better tolerances than are currently available to enable the construction of even smaller lenses and numerous lens geometries and sizes. Also each optical device is described with a cylindrical sheath. It will also be apparent that the sheath can have other cross sectional shapes, such as a polygonal shape and that the sheath may or may not define one or more working channels. Still many other modifications can be made to the disclosed apparatus without departing from the invention. Therefore, it is the intent of the appended claims to cover all such variations and modifications as come within the true spirit and scope of this invention.

The invention claimed is:

1. An optical device extending along a geometric axis comprising:
   A) a final lens element formed from an initial lens element characterized by centered, rotational symmetry about an optical axis, said final lens element having polished image forming surfaces transverse to the geometric axis at each end of said final lens element and at least three sawn planar faces extending between said image forming surfaces parallel to and spaced from the geometric axis, whereby said final lens element has the cross section of a polygon, and
   B) a sheath supporting said final lens element.

2. An optical device as recited in claim 1 wherein said sheath has a cylindrical cross section.

3. An optical device as recited in claim 2 having four planar surfaces whereby said final lens element has a rectangular cross section.

4. An optical device as recited in claim 3 wherein each of said sawn planar faces has an equal dimension whereby said final lens element has a square cross section.

5. An optical device as recited in claim 1 said final lens element is formed with a geometric axis that is parallel to the optical axis in said initial lens element.

6. An optical device as recited in claim 1 wherein said final lens element is inclusive of portions of said initial lens element including said optical axis.

7. An optical device as recited in claim 6 wherein said optical and geometric axes are parallel.

8. An optical device as recited in claim 6 wherein said optical and geometric axes are coincident.

9. An optical device extending along a geometric axis comprising:
   A) a final lens system formed from a plurality of adjoined initial lens elements having centered, rotational symmetry about an optical axis, each of said initial lens elements having a pair of spaced polished image forming surfaces transverse to the optical and geometric axes, said final lens assembly having at least three sawn planar faces extending along the length thereof parallel to and spaced from the geometric axis, whereby said final lens system, and each lens element therein has the cross section of a polygon, and
   B) a sheath surrounding and contacting said final lens assembly thereby to support said final lens system along the geometric axis.

10. An optical device as recited in claim 9 wherein said sheath has a cylindrical cross section.

11. An optical device as recited in claim 9 having four planar surfaces whereby said lens assembly has a rectangular cross section.

12. An optical device as recited in claim 11 wherein each of said surfaces has an equal dimension whereby said final lens system has a square cross section.

13. An optical device as recited in claim 9 wherein said final lens system is formed with a geometric axis that is parallel to the optical axis.

14. An optical device as recited in claim 9 wherein said final lens assembly is inclusive of portions of said lens elements including said optical axis.

15. An optical device as recited in claim 14 wherein said optical and geometric axes are parallel.

16. An optical device as recited in claim 14 wherein said optical and geometric axes are coincident.

17. A method for making a lens system extending along a geometric axis comprising:
   A) constructing an initial lens system with a least one lens element, each lens element having an optical axis and being characterized by a centered rotational symmetry about the optical axis and by polished image forming surfaces transverse to the optical axis, and
   B) removing portions of the lens elements in the lens system by sawing thereby to form sawn planar faces on the lens system parallel to the geometric axis whereby said lens system has the cross section of a polygon.

18. A method as recited in claim 17 comprising the step of locating the polygonal lens system in a sheath with the intersections of said planar faces being in contact with the sheath.

19. A method as recited in claim 17 wherein said sawing includes position the lens system with respect to a saw and whereby portions of the lens element that are removed lie outside said portions of said lens elements inclusive of the geometric and optical axes whereby the final lens assembly includes both the optical and geometric axes.

20. A method as recited in claim 19 wherein said positioning enables the final lens system to have parallel optical and geometric axes.

21. A method as recited in claim 19 wherein said positioning enables the final lens system to have coincident optical and geometric axes.

22. A method as recited in claim 21 wherein said portions removal forms four intersecting sawn faces thereby to form the lens system with a rectangular cross section.

23. A method as recited in claim 21 wherein said portions removal forms four intersecting sawn faces thereby to form the lens system with a square cross section.

24. A method as recited in claim 19 wherein said sawing includes sawing with a dicing saw.

25. A method as recited in claim 17 wherein said sawing includes sawing with a dicing saw.

* * * * *

UNITED STATES PATENT AND TRADEMARK OFFICE
CERTIFICATE OF CORRECTION

PATENT NO. : 7,116,486 B2 Page 1 of 1
APPLICATION NO. : 10/659727
DATED : October 3, 2006
INVENTOR(S) : Richard E. Forkey et al.

It is certified that error appears in the above-identified patent and that said Letters Patent is hereby corrected as shown below:

In the Title:

Item 54 and Col. 1, Line 1

Delete "CYLINDRICAL" and insert --ACYLINDRICAL --

Signed and Sealed this

Third Day of April, 2007

JON W. DUDAS
*Director of the United States Patent and Trademark Office*